(12) United States Patent
Baek et al.

(10) Patent No.: US 11,143,174 B2
(45) Date of Patent: Oct. 12, 2021

(54) COMPRESSOR

(71) Applicant: Hanon Systems, Daejeon (KR)

(72) Inventors: Chan Ho Baek, Daejeon (KR); Jung Myung Kwak, Daejeon (KR); Sang Dong Min, Gyeongsangbuk-do (KR); Kyung Jae Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 142 days.

(21) Appl. No.: 16/481,922

(22) PCT Filed: Mar. 21, 2018

(86) PCT No.: PCT/KR2018/003292
§ 371 (c)(1),
(2) Date: Jul. 30, 2019

(87) PCT Pub. No.: WO2018/174558
PCT Pub. Date: Sep. 27, 2018

(65) Prior Publication Data
US 2019/0376497 A1 Dec. 12, 2019

(30) Foreign Application Priority Data

Mar. 24, 2017 (KR) .................. 10-2017-0037480
Jun. 30, 2017 (KR) .................. 10-2017-0083328

(51) Int. Cl.
*F04B 17/06* (2006.01)
*F04B 39/00* (2006.01)
(Continued)

(52) U.S. Cl.
CPC .............. *F04B 17/06* (2013.01); *F04B 17/05* (2013.01); *F04B 27/08* (2013.01);
(Continued)

(58) Field of Classification Search
CPC .......... F04B 17/05; F04B 27/08; F04B 27/18; F16D 27/00; G01P 3/46
See application file for complete search history.

(56) References Cited

U.S. PATENT DOCUMENTS

| 5,022,826 A | 6/1991 | Matsuda et al. |
| 5,540,560 A * | 7/1996 | Kimura ............... F04B 27/1054 417/223 |

(Continued)

FOREIGN PATENT DOCUMENTS

| EP | 2372155 A2 | 10/2011 |
| JP | H02294569 A | 12/1990 |
| JP | 2005-083325 A | 3/2005 |
| JP | 2006200529 A | 8/2006 |
| JP | 2007024257 A | 2/2007 |
| JP | 2008163914 A | 7/2008 |
| KR | 20050025268 A | 3/2005 |
| KR | 20090130649 A | 12/2009 |

(Continued)

*Primary Examiner* — Patrick Hamo
(74) *Attorney, Agent, or Firm* — Norton Rose Fulbright US LLP; James R. Crawford (57) ABSTRACT

A compressor that includes a casing, a compression mechanism provided inside the casing to compress a refrigerant, a rotary shaft transmitting a rotational force to the compression mechanism from a drive source provided outside the casing, a clutch connecting the drive source and the rotary shaft by a magnetic force generated when electric power is applied to the clutch and disconnecting the drive source and the rotary shaft by losing the magnetic force when the electric power applied thereto is cut off, and a rotation measurement means for receiving the magnetic force from the clutch to measure a change in magnetic flux according to the rotation of the rotary shaft and measure a rotational speed of the rotary shaft. Thus, it is possible to measure the rotational speed of the rotary shaft without including a permanent magnet.

10 Claims, 11 Drawing Sheets

(51) Int. Cl.
*F04B 39/12* (2006.01)
*G01P 3/46* (2006.01)
*F04B 27/18* (2006.01)
*F16D 27/06* (2006.01)
*F04B 17/05* (2006.01)
*F04B 27/08* (2006.01)
*F16D 27/00* (2006.01)

(52) U.S. Cl.
CPC .......... *F04B 27/0895* (2013.01); *F04B 27/18* (2013.01); *F04B 39/00* (2013.01); *F04B 39/0094* (2013.01); *F04B 39/121* (2013.01); *F16D 27/00* (2013.01); *F16D 27/06* (2013.01); *G01P 3/46* (2013.01); *F04B 2201/08* (2013.01)

(56) References Cited

U.S. PATENT DOCUMENTS

| | | | |
|---|---|---|---|
| 6,247,900 B1* | 6/2001 | Archibald | F04B 27/1036 417/222.1 |
| 6,419,585 B1* | 7/2002 | Kimura | F16D 9/00 417/319 |
| 2007/0017771 A1* | 1/2007 | Ishii | F04B 27/0895 192/84.961 |
| 2019/0003467 A1* | 1/2019 | Domke | F04B 27/18 |

FOREIGN PATENT DOCUMENTS

| | | |
|---|---|---|
| KR | 20100022824 A | 3/2010 |
| KR | 20100063426 A | 6/2010 |
| KR | 20100091796 A | 8/2010 |

* cited by examiner

COMPRESSOR

This application is a national phase under 35 U.S.C. § 371 of International Application No. PCT/KR2018/003292 filed Mar. 21, 2018, which claims the benefit of priority from Korean Patent Application Nos. 10-2017-0083328 filed on Jun. 30, 2017 and 10-2017-0037480 filed on Mar. 24, 2017. The entire contents of these applications are incorporated herein by reference in their entirety.

TECHNICAL FIELD

The present disclosure relates to a compressor, and more particularly, to a compressor capable of measuring a rotational speed of a rotary shaft for transmitting rotational force from a drive source to a compression mechanism.

BACKGROUND ART

In general, a vehicle is equipped with an air conditioning (A/C) system for cooling/heating the interior thereof. This air conditioning system includes a compressor that is the component of a cooling system and compresses a low-temperature and low-pressure gas-phase refrigerant, introduced from an evaporator, to high temperature and high pressure to send it to a condenser.

As an example of the compressor, there are a reciprocating compressor that compresses a refrigerant according to which pistons reciprocate, and a rotary compressor that compresses a refrigerant while rotating. Examples of the reciprocating compressor include a crank compressor that transmits a driving force from a drive source to a plurality of pistons using a crank, a swash plate compressor that transmits a driving force from a drive source to a rotary shaft installed with a swash plate, and the like, according to the power transmission method from the drive source. Examples of the rotary compressor include a vane rotary compressor that utilizes a rotating rotary shaft and vane, and a scroll compressor that utilizes an orbiting scroll and a fixed scroll.

Such a compressor typically includes a rotary shaft for transmitting a rotational force to a compression mechanism compressing a refrigerant.

Specifically, referring to Japanese Patent No. 2715544, a conventional compressor includes a casing, a compression mechanism 11 or 13 provided inside the casing to compress a refrigerant, a rotary shaft 4 for transmitting a rotational force to the compression mechanism 11 or 13 from a drive source (for example, an engine) provided outside the casing, and a clutch for selectively connecting and disconnecting the drive source and the rotary shaft 4.

The clutch includes a pulley (not shown) that is rotated by the power transmitted from the drive source, a disk/hub assembly (not shown) that is fastened to the rotary shaft 4 and selectively comes into contact with and separates from the pulley, a field coil assembly 9 that generates a magnetic force when electric power is applied thereto to make contact between the pulley and the disk/hub assembly, and a separation means (not shown) for separating the pulley and the disk/hub assembly when the electric power applied to the field coil assembly 9 is cut off and loses its magnetic force.

The pulley and the drive source are interconnected by a drive belt to transmit power from the drive source to the pulley.

If any trouble arises in the compressor, the disk/hub assembly may not be normally rotated when the pulley is in contact with the disk/hub assembly even though the pulley receives power from the drive source.

In this case, a slip occurs on the drive belt connected to the drive source and the pulley of the compressor, which may damage the drive source as well as the compressor.

Accordingly, in order to prevent the belt slip in advance, it is necessary to compare the rotational speed of the drive source with the rotational speed of the compressor so as to stop the clutch when any trouble occurs in the compressor.

In consideration of this fact, the conventional compressor is provided with a rotation measurement means including a permanent magnet 17 mounted to rotate along with the rotary shaft and a sensor 18 for measuring a change in magnetic flux of the permanent magnet so as to measure the rotational speed of the rotary shaft 4.

In the conventional compressor, the rotation measurement means includes the permanent magnet 17. Hence, the compressor is problematic in that the inertia of the rotating body is increased, the balance of the rotating body becomes unstable to deteriorate noise and vibration, and the bearing supporting the rotating body is damaged. In addition, the compressor is problematic in that its size must be increased to prevent the permanent magnet from colliding with other components when the permanent magnet rotates and its weight and cost are increased due to the addition of another permanent magnet and the increase in the size of the compressor.

Since the sensor 18 of the rotation measurement means is installed through the casing, a refrigerant may leak through the through-hole of the casing for installation of the sensor.

There is a problem that it takes a considerable cost and time to install the rotation measurement means in order to prevent the leakage of refrigerant.

In addition, the rotation measurement means may be decoupled during operation.

DISCLOSURE

Technical Problem

Accordingly, it is an object of the present disclosure to provide a compressor capable of measuring a rotational speed of a rotary shaft without including a permanent magnet.

It is another object of the present disclosure to provide a compressor capable of preventing a leakage of refrigerant due to a rotation measurement means for measuring a rotational speed of a rotary shaft.

It is yet another object of the present disclosure to provide a compressor capable of reducing the cost and time required to install a rotation measurement means.

It is a further object of the present disclosure to provide a compressor capable of preventing a rotation measurement means from being decoupled during operation.

Technical Solution

To accomplish the above objects, in accordance with an aspect of the present disclosure, there is provided a compressor that includes a casing, a compression mechanism provided inside the casing to compress a refrigerant, a rotary shaft transmitting a rotational force to the compression mechanism from a drive source provided outside the casing, a clutch connecting the drive source and the rotary shaft by a magnetic force generated when electric power is applied to the clutch and disconnecting the drive source and the rotary shaft by losing the magnetic force when the electric power applied thereto is cut off, and a rotation measurement means for receiving the magnetic force from the clutch to measure a change in magnetic flux according to the rotation of the rotary shaft and measure a rotational speed of the rotary shaft.

The rotation measurement means may be seated to a sensor mounting groove formed in the casing, the sensor mounting groove may be formed in an outer surface of the casing, and the compressor may include a fixing means for fixing the rotation measurement means in the sensor mounting groove.

The compression mechanism may include a swash plate obliquely fastened to the rotary shaft to rotate together therewith, a piston accommodated in a bore of the casing and coupled to the swash plate to reciprocate within the bore by the rotation of the swash plate, and an inclination adjustment mechanism adjusting an angle of inclination of the swash plate to the rotary shaft to vary a compression capacity. The inclination adjustment mechanism may include a rotor fastened to the rotary shaft to be rotated and excited together with the rotary shaft when the clutch is magnetized. The rotation measurement means may include a hall effect sensor for measuring a magnetic flux of the rotor.

The hall effect sensor may be formed adjacent to the rotor.

The hall effect sensor may be disposed within a line of magnetic force formed between the clutch and the rotor.

The fixing means may be fixed when the hall effect sensor is inserted into the sensor mounting groove.

At least one hook may be formed in the hall effect sensor, and a hook groove for insertion of the hook may be formed in at least one of the casing and the clutch.

The hall effect sensor and the hook may be integrally formed.

The clutch may include a pulley rotated by power transmitted from the drive source, a disk/hub assembly fastened to the rotary shaft and selectively coming into contact with and separating from the pulley, a field coil assembly generating a magnetic force when electric power is applied thereto to make contact between the pulley and the disk/hub assembly, and a separation means for separating the pulley and the disk/hub assembly when the electric power applied to the field coil assembly is cut off and loses its magnetic force. The field coil assembly may include a coil housing and a coil accommodated in the coil housing and generating an electromagnetic force when electric power is applied thereto. The coil housing may include a flange protruding from the coil housing to face the sensor mounting groove. The hall effect sensor may include a sensing portion interposed between the sensor mounting groove and the flange and a fixing portion protruding from the sensing portion and positioned opposite to the sensing portion with respect to the flange.

The fixing portion may be formed with a first hook protruding toward the flange, and the flange may be formed with a first hook groove for insertion of the first hook.

The sensing portion may be formed with a second hook protruding toward the sensor mounting groove, and the sensor mounting groove may be formed with a second hook groove for insertion of the second hook.

When the hall effect sensor is inserted into the sensor mounting groove, the first hook may be inserted into the first hook groove and the second hook may be inserted into the second hook groove. When the first hook is decoupled from the first hook groove, the second hook may be maintained in a state in which it is inserted into the second hook groove.

The hall effect sensor (52) may be formed radially outward of the rotor (232).

Advantageous Effects

A compressor according to the present disclosure may include a casing, a compression mechanism provided inside the casing to compress a refrigerant, a rotary shaft transmitting a rotational force to the compression mechanism from a drive source provided outside the casing, a clutch connecting the drive source and the rotary shaft by a magnetic force generated when electric power is applied to the clutch and disconnecting the drive source and the rotary shaft by losing the magnetic force when the electric power applied thereto is cut off, and a rotation measurement means for receiving the magnetic force from the clutch to measure a change in magnetic flux according to the rotation of the rotary shaft and measure a rotational speed of the rotary shaft. Thus, it is possible to measure the rotational speed of the rotary shaft without including a permanent magnet. Therefore, it is possible to prevent an increase in inertia of a rotating body and an unstable balance to prevent deterioration of noise and vibration and prevent damage of a bearing supporting the rotating body. In addition, it is possible to prevent deterioration of the size, weight, and cost of the compressor due to the permanent magnet.

The present disclosure can prevent a refrigerant from leaking due to the rotation measurement means since a sensor mounting groove for mounting a sensor of the rotation measurement means communicates with the outside of the casing and be shut off from the inside of the casing.

Since the present disclosure includes a fixing means for fixing the rotation measurement means, it is possible to reduce the cost and time required to install the rotation measurement means.

The present disclosure can prevent the rotation measurement means from being decoupled during operation since, as the fixing means, a first hook (H11) and a second hook (H21) are formed in the hall effect sensor, a first hook groove (H12) for insertion of the first hook (H11) is formed in the clutch, and a second hook groove (H22) for insertion of the second hook (H21) is formed in the casing.

BEST MODE FOR INVENTION

Hereinafter, a compressor according to exemplary embodiments of the present disclosure will be described in detail with reference to the accompanying drawings.

Figure 1:
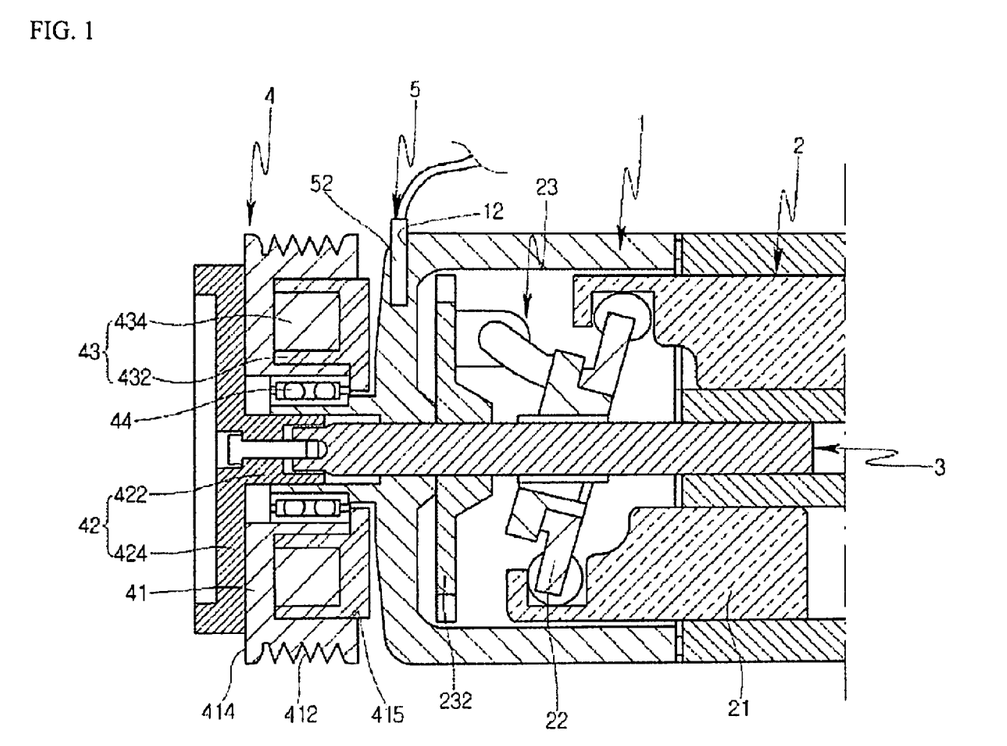
FIG. 1 is a cross-sectional view illustrating a compressor according to an embodiment of the present disclosure.
Figure 2:
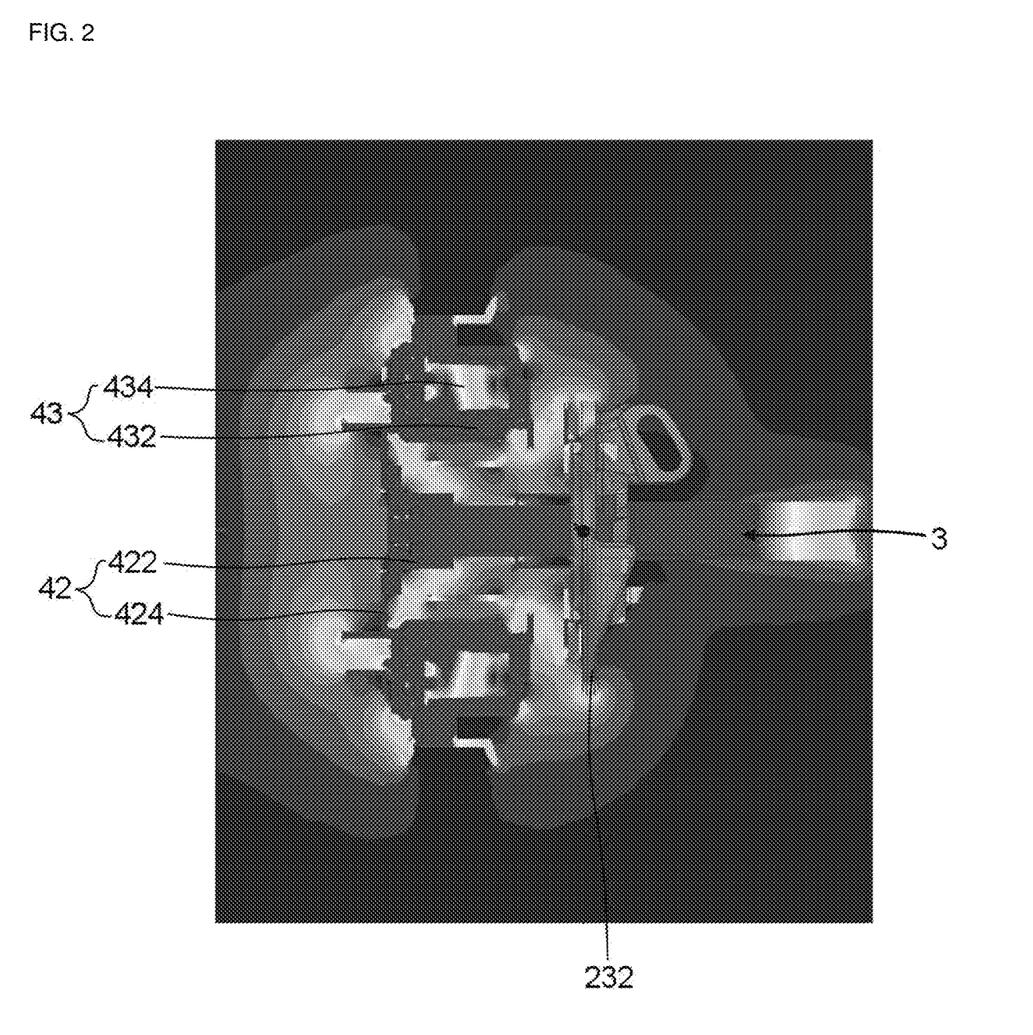
FIG. 2 is a diagram illustrating a magnetization portion and a line of magnetic force when electric power is applied to a coil in the compressor of FIG. 1.

FIG. 1 is a cross-sectional view illustrating a compressor according to an embodiment of the present disclosure. FIG. 2 is a diagram illustrating a magnetization portion and a line of magnetic force when electric power is applied to a coil in the compressor of FIG. 1.

Referring to FIGS. 1 and 2, the compressor according to the embodiment of the present disclosure may include a casing 1, a compression mechanism 2 provided inside the casing 1 to compress a refrigerant, a rotary shaft 3 for transmitting a rotational force to the compression mechanism 2 from a drive source (not shown) (for example, an engine) provided outside the casing 1, and a clutch 4 for selectively connecting and disconnecting the drive source and the rotary shaft 3.

The compression mechanism 2 may be formed in various manners such as in a swash plate manner including a swash plate and a piston and in a scroll manner including an orbiting scroll and a non-orbiting scroll, but it is formed in the swash plate manner in the embodiment. That is, the compression mechanism 2 according to the embodiment may include a piston 21 reciprocatably provided in a bore and a swash plate 22 fastened to the rotary shaft 3 to rotate together therewith for reciprocating the piston 21.

The rotary shaft 3 may be connected to the compression mechanism 2 at one end thereof and may be fastened to a disk/hub assembly 42, which will be described later, of the clutch 4 at the other end thereof, and the other end of the rotary shaft 3 protrudes outside the casing 1 therethrough.

The clutch 4 may include a pulley 41 that is rotated by the power transmitted from the drive source, a disk/hub assembly 42 that is fastened to the rotary shaft 3 and selectively comes into contact with and separates from the pulley 41, a field coil assembly 43 that generates a magnetic force when electric power is applied thereto to make contact between the pulley 41 and the disk/hub assembly 42, and a separation means (not shown) for separating the pulley 41 and the disk/hub assembly 42 when the electric power applied to the field coil assembly 43 is cut off and loses its magnetic force.

The pulley 41 has a substantially annular shape. The pulley 41 may have a drive belt fastening surface 412 formed on the outer peripheral surface thereof so that a drive belt (not shown) for transmitting a driving force from the drive source to the pulley 41 is installed on the drive belt fastening surface 412, and a bearing 44 may be interposed between the inner peripheral surface of the pulley 41 and the outer surface of the casing 1 to rotatably support the pulley 41.

The pulley 41 may have a friction surface 414 formed on one side thereof so that the friction surface comes into contact with a disk 424, which will be described later, of the disk/hub assembly 42, and a field coil assembly receiving groove 415 formed on the other side thereof so that the field coil assembly 43 is inserted into the field coil assembly receiving groove 415.

The disk/hub assembly 42 may include a hub 422 that is fastened to the rotary shaft 3 and a disk 424 that extends from the hub 422 and selectively comes into contact with and separates from the pulley 41.

The field coil assembly 43 may include a coil housing 432 and a coil 434 accommodated in the coil housing 432 and generates an electromagnetic force when electric power is applied thereto.

The separation means may be an elastic member that applies a force to the disk/hub assembly 42 in a direction in which the disk/hub assembly 42 is away from the pulley 41.

The compressor having the above configuration according to the embodiment may operate as follows.

That is, the pulley 41 may be rotated by the driving force transmitted from the drive source.

In this state, when electric power is applied to the coil 434, the disk/hub assembly 42 may be moved toward the pulley 41 by the attractive force caused by the magnetic induction of the coil 434 and come into contact with the pulley 41. That is, by coupling between the disk/hub assembly 42 and the pulley 41, the power of the drive source may be transmitted to the rotary shaft 3 through the pulley 41 and the disk/hub assembly 42. The rotary shaft 3 may operate the compression mechanism 2 by the power transmitted thereto to compress a refrigerant.

On the other hand, when the electric power applied to the coil 434 is interrupted, the attractive force by the magnetic induction of the coil 434 is not generated anymore and the disk/hub assembly 42 may be moved away from the pulley 41 by the separation means so as to be separated from the pulley 41. That is, the power transmission from the drive source to the rotary shaft 3 may be interrupted. The operation of the compression mechanism 2 may be stopped and the compression of the refrigerant may be stopped.

In this process, when the disk/hub assembly 42 comes into contact with the pulley 41 in the state in which the rotational speed of the disk/hub assembly 42 differs from that of the pulley 41, a slip may occur between the disk/hub assembly 42 and the pulley 41 to cause noise and vibration or the impact of the contact between the disk/hub assembly 42 and the pulley 41 may cause at least one of the drive belt, the drive source, and the compressor to be damaged. The pulley 41 and the drive source are interconnected by the drive belt to transmit power from the drive source to the pulley 41.

If any trouble arises in the compressor, the disk/hub assembly 42 may not be normally rotated when the pulley is in contact with the disk/hub assembly 42 even though the pulley 41 receives power from the drive source.

In this case, a slip occurs on the drive belt connected to the drive source and the pulley 41 of the compressor, which may damage the drive source as well as the compressor.

In order to resolve these problems, the compressor according to the embodiment may include a rotation measurement means 5 for measuring the rotational speed of the rotary shaft 3.

Here, the rotation measurement means 5 may measure the rotational speed of the rotary shaft 3 without including a permanent magnet.

Specifically, as a result of the study, it is seen that the rotary shaft 3 and the component (for example, a rotor 232 to be described later) rotated together with the rotary shaft 3 are also magnetized (the red area in the drawing) when the clutch 4 is magnetized as illustrated in FIG. 2.

By using this fact, the rotation measurement means 5 may include a hall effect sensor 52 for measuring a change in magnetic flux of the magnetized rotary shaft 2 or a change in magnetic flux of the component rotated together with the rotary shaft 3. That is, the rotation measurement means 5 does not include a permanent magnet and does not measure a change in magnetic flux by the permanent magnet.

Thus, the compressor according to the embodiment can prevent an increase in inertia of the rotating body by the permanent magnet, a deterioration in balance of the rotating body, a deterioration of noise and vibration, damage of the bearing supporting the rotating body, a refrigerant leakage, an increase in size of the compressor, an increase in weight of the compressor, and an increase in cost of the compressor.

Meanwhile, it is preferable that the hall effect sensor 52 measures a change in magnetic flux of the component rotated together with the rotary shaft 3 rather than measuring a change in magnetic flux of the rotary shaft 3.

Specifically, the accuracy of the hall effect sensor 52 can be improved as the hall effect sensor approaches a measurement object.

Accordingly, when the hall effect sensor 52 is formed to measure a change in magnetic flux of the rotary shaft 3, the hall effect sensor 52 is preferably installed adjacent to the rotary shaft 3 and more preferably installed within a line of magnetic force formed between the clutch 4 and the rotary shaft 3. In this case, the rotary shaft 3 has a relatively small diameter. Hence, the hall effect sensor 52 may be adjacent to the rotary shaft 3 when it must be fixed in the center of the internal space of the casing 1. However, it may not be easy to fix the hall effect sensor 52 in the center of the internal space of the casing 1. In addition, since the line of magnetic force formed between the clutch 4 and the rotary shaft 3 has a narrow range, it may not be easy to dispose the hall effect sensor 52 at a position for improving the accuracy thereof.

On the other hand, when the hall effect sensor 52 is formed to measure a change in magnetic flux of the component rotated together with the rotary shaft 3, the hall effect sensor 52 may be easily disposed at a position for improving the accuracy thereof. That is, in the case where the compressor is formed in the swash plate manner as in the embodiment, the compressor includes an inclination adjustment mechanism 23 for adjusting an angle of inclination of the swash plate 22 to the rotary shaft 3 to adjust a compression capacity, and the inclination adjustment mechanism 23 includes a rotor 232 fastened to the rotary shaft 3 to rotate together therewith. The rotor 232 is magnetized when the clutch 4 is magnetized, and the hall effect sensor 52 measures a change in magnetic flux of the magnetized rotor 232. Specifically, the rotor 232 is not circular, but when the rotor 232 is bisected about its center, a first region (hatched region) and a second region (plain region) have different radii and the boundary between the two halves protrudes. When the rotor 232 rotates, the change in magnetic flux is caused by the protruding region and the hall effect sensor 52 detects and measures it.

In this case, when the hall effect sensor 52 is formed to measure a change in magnetic flux of the rotor 232, the hall effect sensor 52 is preferably installed adjacent to the rotor 232 and more preferably installed within a line of magnetic force formed between the clutch 4 and the rotor 232. In this case, the rotor 232 has a relatively large diameter. Therefore, the hall effect sensor 52 may be adjacent to the rotor 232 even though it is fixed in the casing 1. Since the line of magnetic force formed between the clutch 4 and the rotor 232 is relatively wide, it may be easier to dispose the hall effect sensor 52 at a position for improving the accuracy thereof. Particularly, the hall effect sensor 52 may malfunction when it is installed in a region where the magnetized regions red regions) are overlapped as illustrated in FIG. 2. Therefore, the hall effect sensor 52 is preferably disposed in the upper housing of the rotor 232. If the hall sensor 52 is disposed adjacent to the clutch 4 instead of the rotor 232, the hall effect sensor 52 is to measure the magnetization of the clutch 4 instead of that of the rotor 232. In this case, it is difficult to determine that the rotation of the compressor is accurately detected. Accordingly, the hall effect sensor 52 is preferably disposed adjacent to the rotor 232 even when it is disposed between the clutch 4 and the rotor 232.

Meanwhile, the hall effect sensor 52 may be mounted in a sensor mounting groove 12 formed in the casing 1 and the sensor mounting groove 12 may be concavely formed from the outer surface of the casing 1. That is, the sensor mounting groove 12 may communicate with the outside of the casing 1 and be shut off from the inside of the casing 1. Thereby, it is possible to prevent a refrigerant from leaking due to the sensor mounting groove 12. That is, since the sensor mounting groove 12 is formed so as not to pass through the casing 1, it is possible to prevent a refrigerant from leaking to the outside of the casing 1 from the inside thereof through the sensor mounting groove 12.

Figure 3:
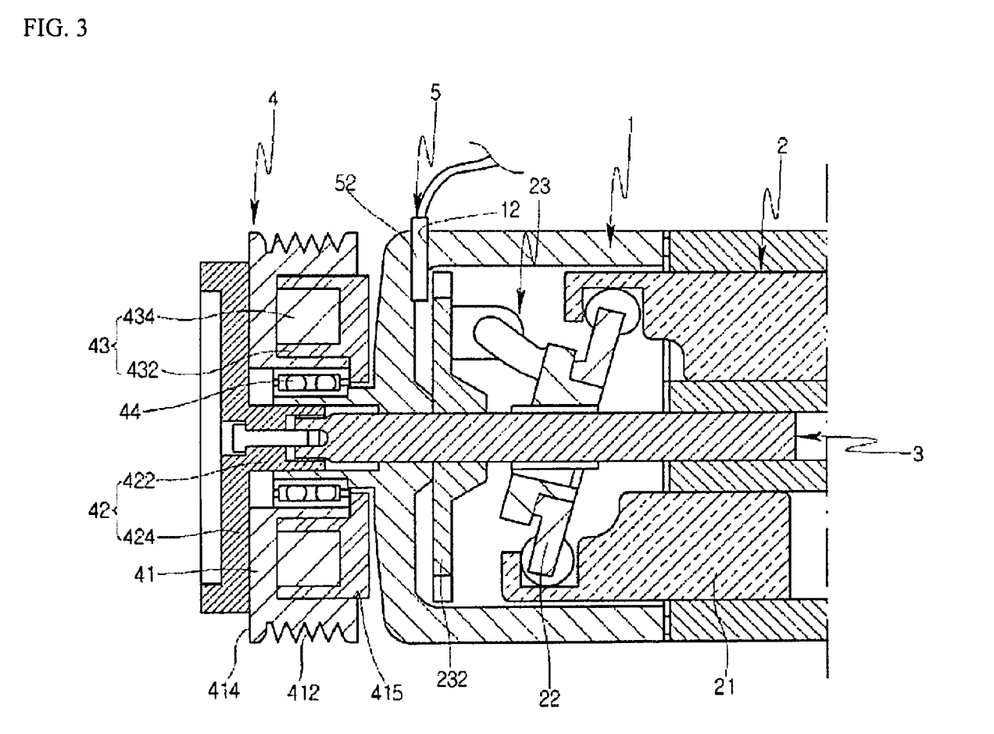
FIGS. 3 to 5 are cross-sectional views illustrating a compressor according to another embodiment of the present disclosure.
Figure 5:
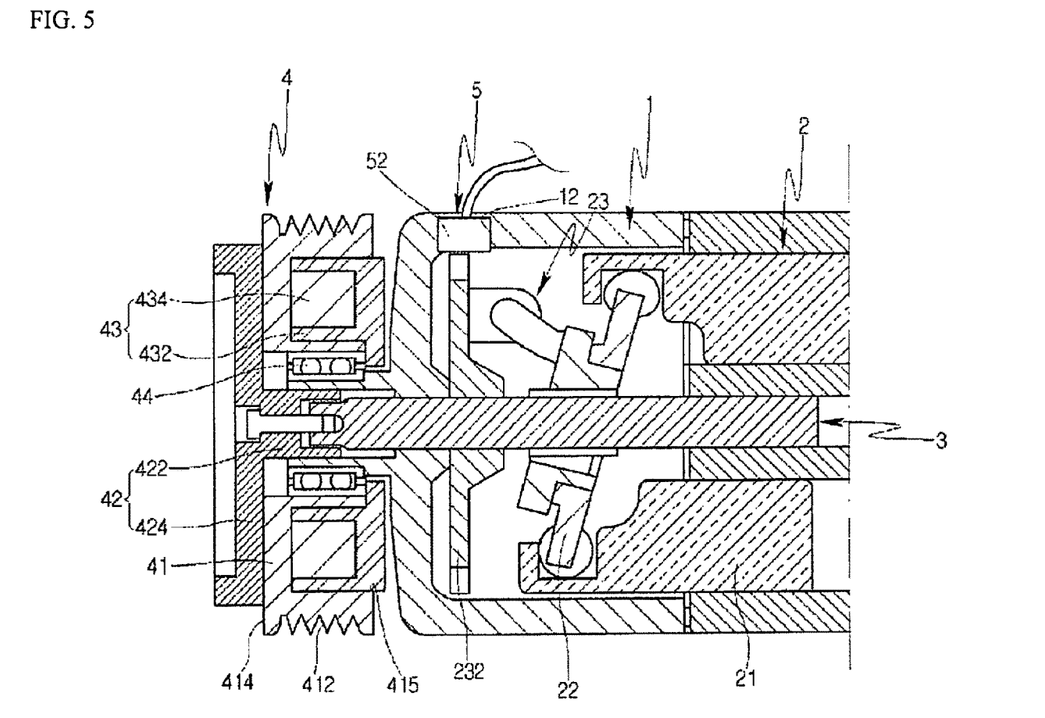

In the embodiment, the sensor mounting groove 12 is formed so as not to pass through the casing 1 to prevent a refrigerant from leaking due to the sensor mounting groove 12. However, for example, when the refrigerant leakage due to the sensor mounting groove 12 is not concerned or the refrigerant leakage is easily prevented by a sealing member or the like as in the low-pressure compressor, the sensor mounting groove 12 may be formed through the casing 1 as illustrated in FIG. 3 or 5. In this case, since the hall sensor 52 is disposed closer to the rotor 232, the accuracy of the hall effect sensor 52 can be improved.

Figure 4:
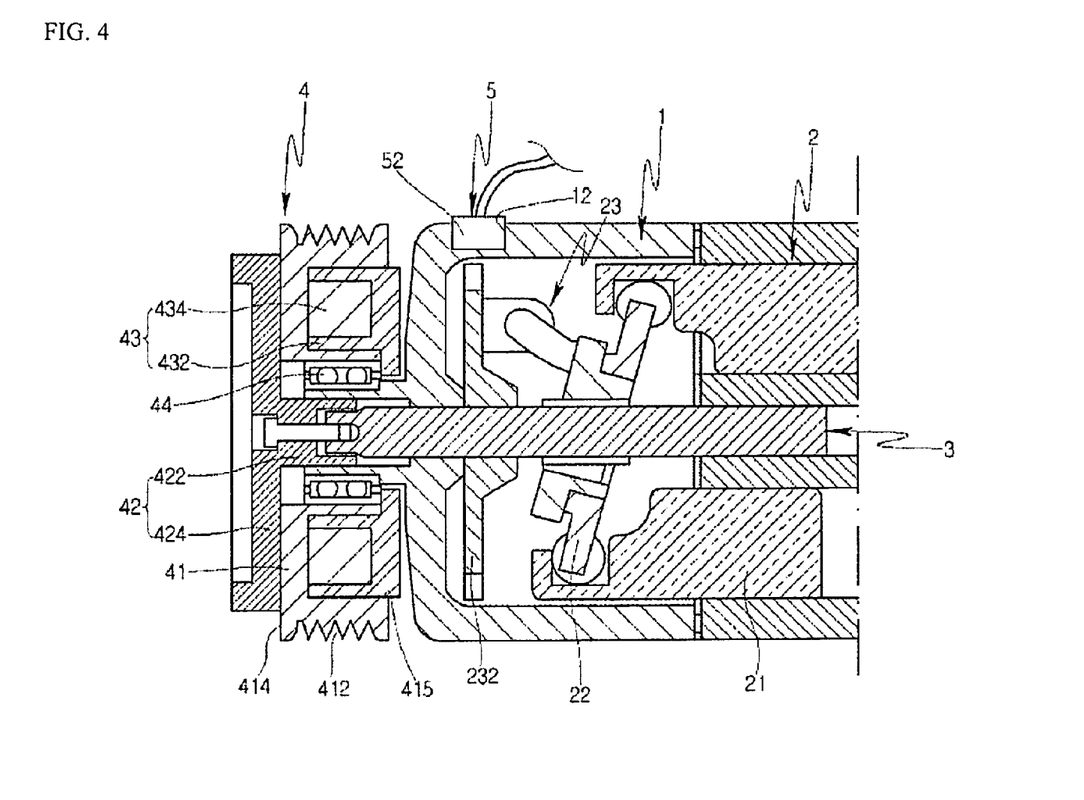

In the embodiment, the hall effect sensor 52 is interposed between the clutch 4 and the rotor 232 to maximize the accuracy of the hall effect sensor 52. However, the installation of the hall sensor 52 may not be easy since the space between the clutch 4 and the rotor 232 is small. In consideration of this fact, the hall effect sensor 52 may be disposed radially outward of the rotor 232 as illustrated in FIG. 4 or 5. In this case, the accuracy of the hall effect sensor 52 is somewhat low, but the hall effect sensor 52 may be easily installed.

In the embodiment, the hall effect sensor 52 is inserted into the sensor mounting groove 12, in which case the hall effect sensor 52 may be decoupled from the sensor mounting groove 52 during operation. In consideration of this fact, the compressor may include a fixing means for fixing the hall effect sensor 52 in the sensor mounting groove 12 as illustrated in FIGS. 6 to 11.

Figure 6:
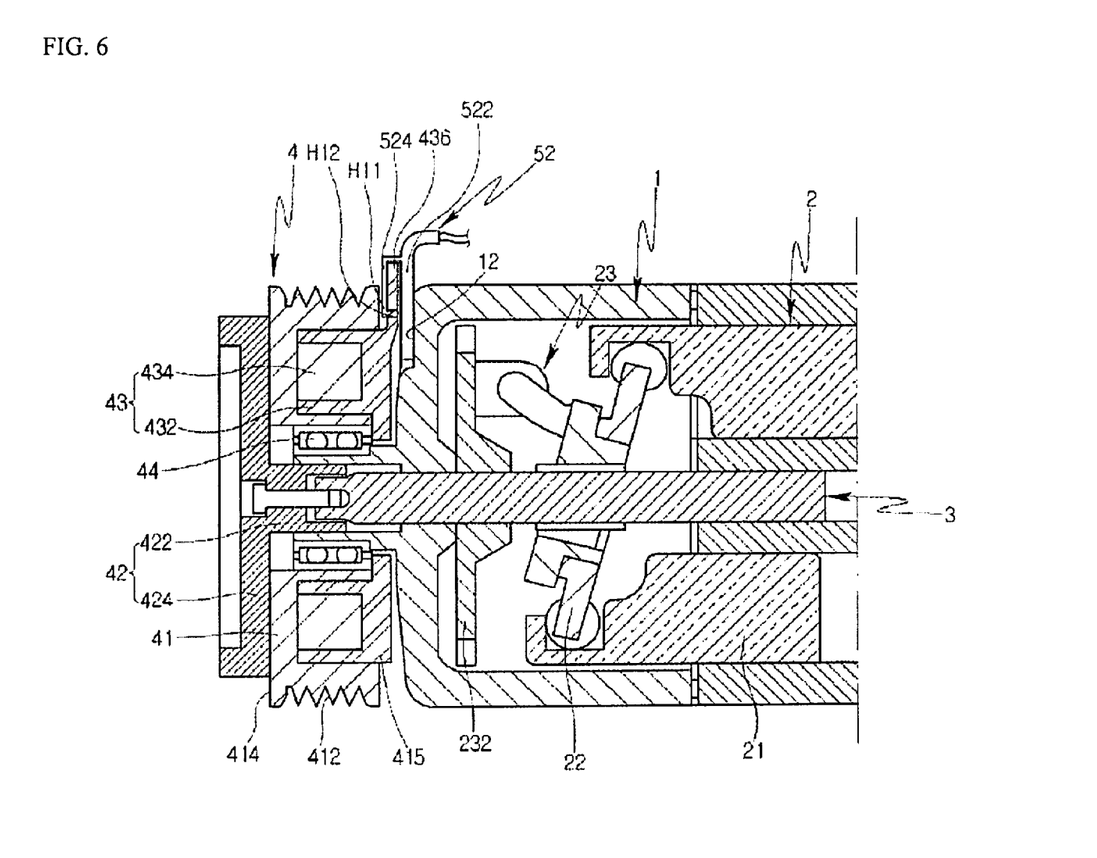
FIG. 6 is a cross-sectional view illustrating a compressor according to yet another embodiment of the present disclosure.
Figure 7:
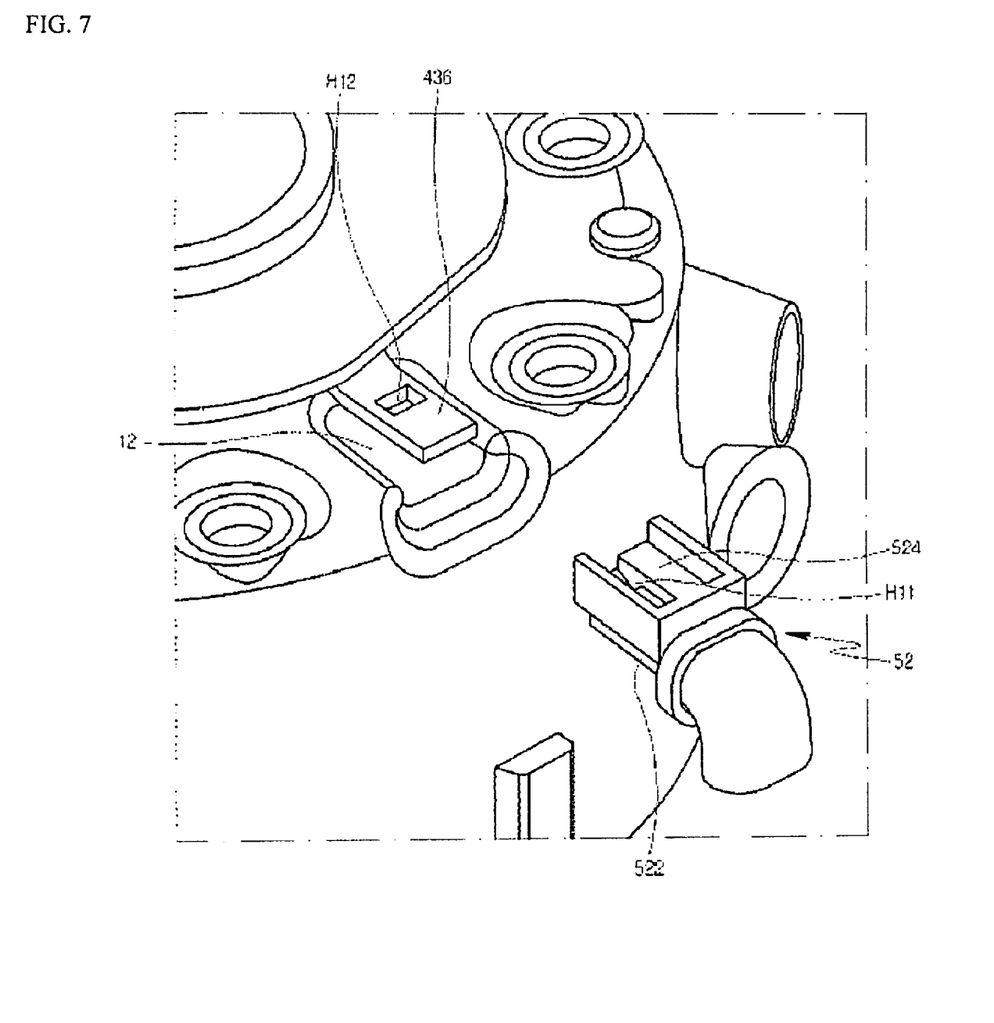
FIG. 7 is an exploded perspective view illustrating a hall effect sensor mounting portion in the compressor of FIG. 6.
Figure 8:
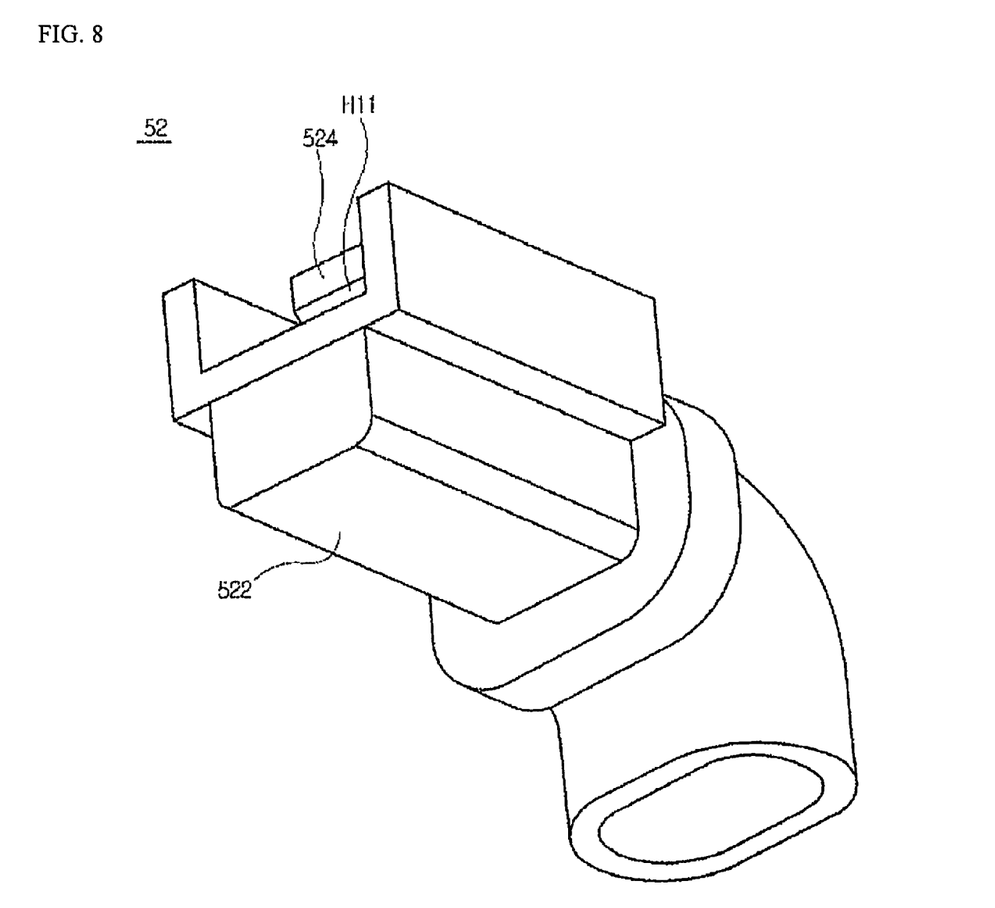
FIG. 8 is a perspective view illustrating the hall effect sensor of FIG. 7 when viewed from the bottom.
Figure 9:
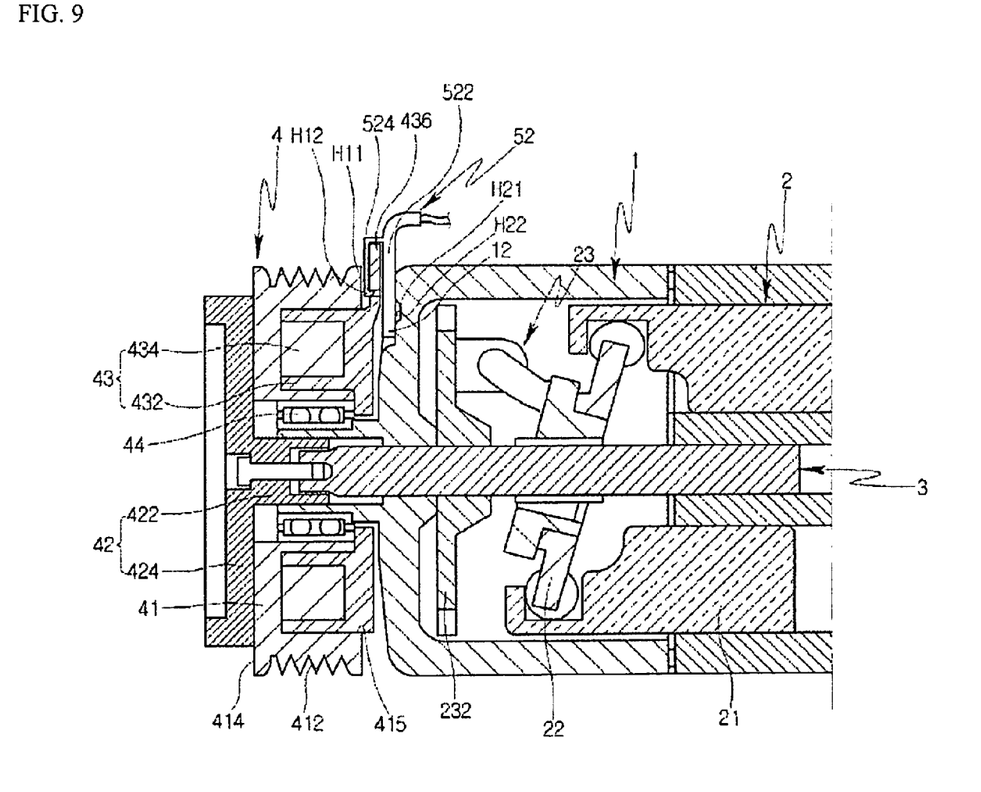
FIG. 9 is a cross-sectional view illustrating a compressor according to a further embodiment of the present disclosure.
Figure 10:
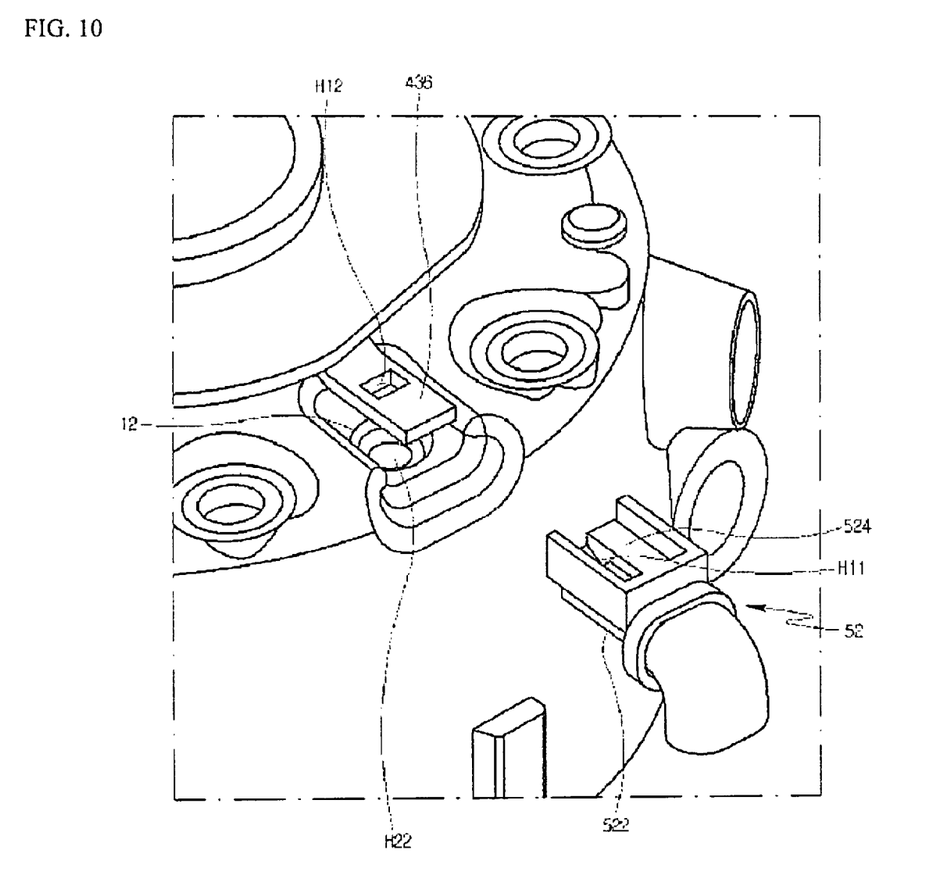
FIG. 10 is an exploded perspective view illustrating a hall effect sensor mounting portion in the compressor of FIG. 9.
Figure 11:
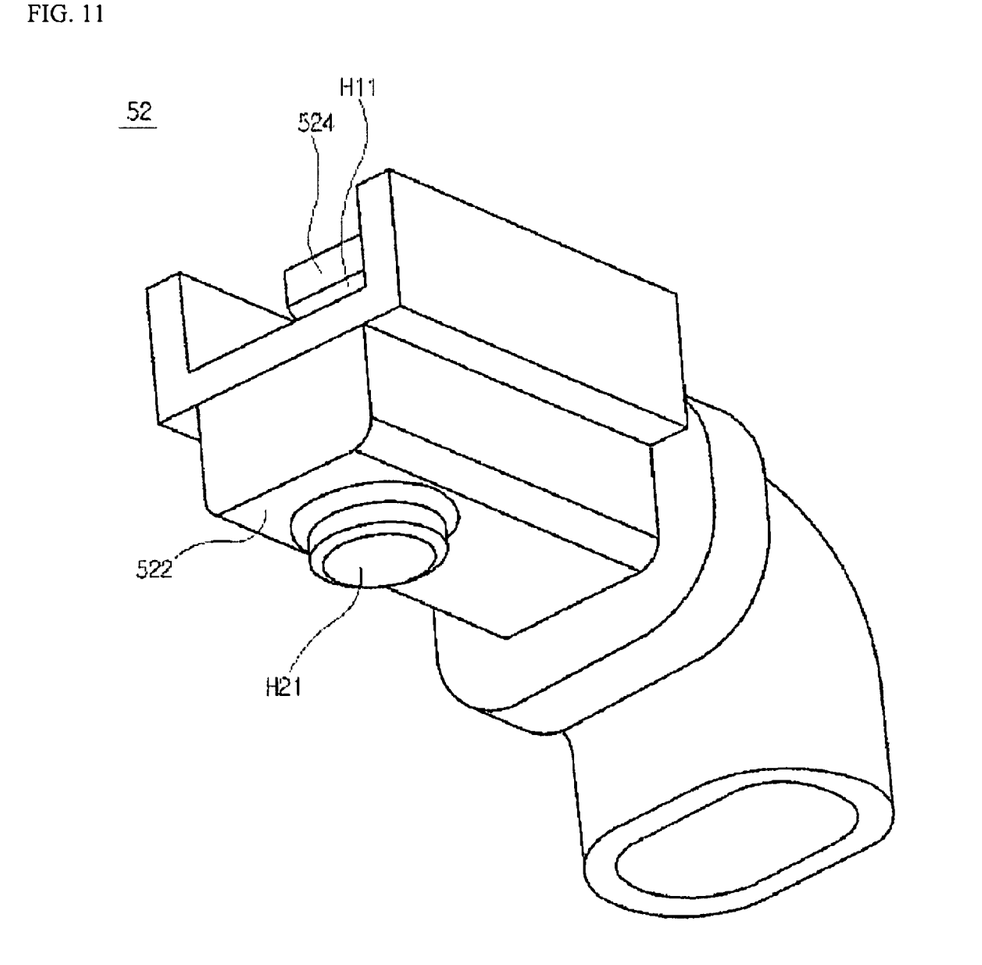
FIG. 11 is a perspective view illustrating the hall effect sensor of FIG. 10 when viewed from the bottom.

FIG. 6 is a cross-sectional view illustrating a compressor according to yet another embodiment of the present disclosure. FIG. 7 is an exploded perspective view illustrating a hall effect sensor mounting portion in the compressor of FIG. 6. FIG. 8 is a perspective view illustrating the hall effect sensor of FIG. 7 when viewed from the bottom. FIG. 9 is a cross-sectional view illustrating a compressor according to a further embodiment of the present disclosure. FIG. 10 is an exploded perspective view illustrating a hall effect sensor mounting portion in the compressor of FIG. 9. FIG. 11 is a perspective view illustrating the hall effect sensor of FIG. 10 when viewed from the bottom.

Referring to FIGS. 6 to 8, the compressor according to the embodiment illustrated in FIGS. 6 to 8 may further include a fixing means for fixing the hall effect sensor 52 in the sensor mounting groove 12 to prevent the hall effect sensor 52 from being decoupled from the sensor mounting groove 12.

Unlike the embodiment illustrated in FIGS. 6 to 8, the fixing means may be a separate fastening member such as a bolt. That is, the hall effect sensor 52 may be fixed in the sensor mounting groove 12 by inserting the hall effect sensor 52 into the sensor mounting groove 12 and fastening it using the separate fastening member. In this case, it may take a considerable cost and time to include the separate fastening member and fix the hall effect sensor 52 in the sensor mounting groove 12 using the separate fastening member.

In consideration of this fact, the fixing means according to the embodiment illustrated in FIGS. 6 to 8 may fix the hall effect sensor 52 when the hall effect sensor 52 is inserted into the sensor mounting groove 12 to reduce the cost and time required to fix the hall effect sensor 52. That is, in order to fix the hall effect sensor 52 in the sensor mounting groove 12 at a time, the hall effect sensor 52 may have a first hook H11 and the clutch 4 may have a first hook groove H12 for insertion of the first hook H11.

In more detail, the sensor mounting groove 12 may be open toward the clutch 4.

The coil housing 432 of the clutch 4 may include a flange 436 protruding from the coil housing 432 to face the opening of the sensor mounting groove 12.

The first hook groove H12 passing through the flange 436 may be formed in the tip of the flange 436.

The hall effect sensor 52 may include a sensing portion 522 that is inserted and seated in the sensor mounting groove 12 and interposed between the sensor mounting groove 12 and the flange 436, and a fixing portion 524 that protrudes from the sensing portion 522 and is positioned opposite to the sensing portion 522 with respect to the flange 436.

The first hook H11 protruding to the sensing portion 522 may be formed at the tip of the fixing portion 524. Here, the fixing portion 524 and the first hook H11 may be integrally formed to reduce the cost and time required to form the fixing portion 524 and the first hook H11.

Through such a configuration, the hall effect sensor 52 may be fixed in the sensor mounting groove 12 by coupling the first hook H11 to the first hook groove H12 when the hall effect sensor 52 is inserted into the sensor mounting groove 12. Thereby, it is possible to prevent the decoupling of the hall effect sensor 52 from the sensor mounting groove 12 during operation and fix the hall effect sensor 52 in the sensor mounting groove 12 at low time and cost.

Although the first hook H11 is formed in the hall effect sensor 52 and the first hook groove H12 is formed in the clutch 4 in the embodiment illustrated in FIGS. 6 to 8, the present disclosure is not limited thereto. The first hook H11 may be formed in the clutch 4 and the first hook groove H12 may be formed in the hall effect sensor 52.

In the embodiment illustrated in FIGS. 6 to 8, the sensor mounting groove 12 is open toward the clutch 4, the flange 436 is formed in the coil housing 432 of the clutch 4, and the first hook groove H12 is formed in the flange 436 in order to prevent generation of a weak portion in the casing 1 and reduce the cost and time required to form the first hook groove H12. However, the present disclosure is not limited thereto. The sensor mounting groove 12 may be formed in a partition wall (a portion of the casing) between the clutch 4 and the sensor mounting groove 12 similar to FIG. 1, and the first hook groove H12 may be formed in the partition wall. In the embodiment illustrated in FIGS. 6 to 8, the hall effect sensor 52 may be decoupled from the sensor mounting groove 12 by the decoupling of the first hook H11 from the first hook groove H12 due to vibration or the like during operation. In consideration of this fact, as illustrated in FIGS. 9 to 11, it is necessary to prevent the decoupling of the hall effect sensor 52 from the sensor mounting groove 12 even though the first hook H11 is decoupled from the first hook groove H12.

Referring to FIGS. 9 to 11, the compressor according to the embodiment illustrated in FIGS. 9 to 11 may include the first hook H11 and the first hook groove H12 as in the embodiment illustrated in FIGS. 6 to 8 and may further include a second hook H21 formed in the sensing portion 522 and a second hook groove H22 formed in the sensor mounting groove 12 for insertion of the second hook H21.

The second hook H21 may protrude to the sensor mounting groove 12 from the sensing portion 522. The second hook H21 may be formed opposite to the fixing portion 524 with respect to the sensing portion 522.

The second hook groove H22 may be concavely formed from the sensor mounting groove 12.

Through such a configuration, the hall effect sensor 52 may be fixed in the sensor mounting groove 12 at a time as described above. When the hall effect sensor 52 is inserted into the sensor mounting groove 12, the first hook H11 may be inserted into the first hook groove H12 and the second hook H21 may be inserted into the second hook groove H22.

The hall effect sensor 52 may be more securely fixed in the sensor mounting groove 12 by coupling the first hook H11 to the first hook groove H12 and coupling the second hook H21 to the second hook groove H22.

It is possible to prevent the decoupling of the hall effect sensor 52 from the sensor mounting groove 12 by maintaining the state in which the second hook H21 is inserted into the second hook groove H22 even though the first hook H11 is decoupled from the first hook groove H12 during operation.

Although the second hook H21 is formed in the hall effect sensor 52 and the second hook groove H22 is formed in the sensor mounting groove 12 in the embodiment illustrated in FIGS. 9 to 11, the present disclosure is not limited thereto. The second hook H21 may protrude and be formed in the sensor mounting groove 12 and the second hook groove H22 may be formed in the hall effect sensor 52.

Meanwhile, although not separately illustrated, only the second hook H21 and second hook groove H22 may be formed without the first hook H11 and the first hook groove H12.

INDUSTRIAL APPLICABILITY

The present disclosure provides a compressor capable of measuring a rotational speed of a rotary shaft without including a permanent magnet.

The present disclosure provides a compressor capable of preventing a leakage of refrigerant due to a rotation measurement means for measuring a rotational speed of a rotary shaft.

The present disclosure provides a compressor capable of reducing the cost and time required to install a rotation measurement means.

The present disclosure provides a compressor capable of preventing a rotation measurement means from being decoupled during operation.

The invention claimed is:
1. A compressor comprising:
a casing;
a compression mechanism provided inside the casing to compress a refrigerant;
a rotary shaft transmitting a rotational force to the compression mechanism from a drive source provided outside the casing;
a clutch connecting the drive source and the rotary shaft by a magnetic force generated when electric power is applied to the clutch and disconnecting the drive source and the rotary shaft by losing the magnetic force when the electric power applied thereto is cut off; and
a rotation measurement means for receiving the magnetic force from the clutch to measure a change in magnetic flux according to the rotation of the rotary shaft and measure a rotational speed of the rotary shaft, wherein the rotation measurement means is seated to a sensor mounting groove formed in the casing, wherein the sensor mounting groove is formed in an outer surface of the casing, wherein a fixing means for fixing the rotation measurement means in the sensor mounting groove is provided, wherein the clutch comprises a pulley rotated by power transmitted from the drive source, a disk/hub assembly fastened to the rotary shaft and selectively coming into contact with and separating from the pulley, and a field coil assembly generating a magnetic force when electric power is applied thereto to make contact between the pulley and the disk/hub assembly, wherein the field coil assembly comprises a coil housing, wherein the coil housing comprises a flange protruding from the coil housing to face the sensor mounting groove, wherein the fixing means comprises a sensing portion interposed between the sensor mounting groove and the flange and a fixing portion protruding from the sensing portion and positioned opposite to the sensing portion with respect to the flange, thereby being fixed when the rotation measurement means is inserted into the sensor mounting groove, wherein at least one hook is formed in the rotation measurement means, and a hook groove for insertion of the hook is formed in at least one of the casing and the clutch, wherein the fixing portion is formed with a first hook protruding toward the flange, and wherein the flange is formed with a first hook groove for insertion of the first hook.

2. The compressor according to claim 1, wherein:

the compression mechanism comprises a swash plate obliquely fastened to the rotary shaft to rotate together therewith, a piston accommodated in a bore of the casing and coupled to the swash plate to reciprocate within the bore by the rotation of the swash plate, and an inclination adjustment mechanism adjusting an angle of inclination of the swash plate to the rotary shaft to vary a compression capacity;

the inclination adjustment mechanism comprises a rotor fastened to the rotary shaft to be rotated and excited together with the rotary shaft when the clutch is magnetized; and the rotation measurement means comprises a hall effect sensor for measuring a magnetic flux of the rotor.

3. The compressor according to claim 2, wherein the hall effect sensor and the first hook are integrally formed.

4. The compressor according to claim 1, wherein the clutch further comprises a separation means for separating the pulley and the disk/hub assembly when the electric power applied to the field coil assembly is cut off and loses its magnetic force, wherein the field coil assembly further comprises a coil accommodated in the coil housing and generating an electromagnetic force when electric power is applied thereto.

5. The compressor according to claim 2, wherein the hall effect sensor is formed adjacent to the rotor.

6. The compressor according to claim 5, wherein the hall effect sensor is disposed within a line of magnetic force formed between the clutch and the rotor.

7. The compressor according to claim 2, wherein:

the sensing portion is formed with a second hook protruding toward the sensor mounting groove; and the sensor mounting groove is formed with a second hook groove for insertion of the second hook.

8. The compressor according to claim 7, wherein:

when the hall effect sensor is inserted into the sensor mounting groove, the first hook is inserted into the first hook groove and the second hook is inserted into the second hook groove; and when the first hook is decoupled from the first hook groove, the second hook is maintained in a state in which it is inserted into the second hook groove.

9. The compressor according to claim 6, wherein the hall effect sensor is formed radially outward of the rotor.

10. A compressor comprising:

a casing;

a compression mechanism provided inside the casing to compress a refrigerant;

a rotary shaft transmitting a rotational force to the compression mechanism from a drive source provided outside the casing;

a clutch connecting the drive source and the rotary shaft by a magnetic force generated when electric power is applied to the clutch and disconnecting the drive source and the rotary shaft by losing the magnetic force when the electric power applied thereto is cut off; and a rotation measurement means for receiving the magnetic force from the clutch to measure a change in magnetic flux according to the rotation of the rotary shaft and measure a rotational speed of the rotary shaft, wherein the clutch includes a coil generating an electromagnetic force when electric power is applied thereto, wherein the compression mechanism comprises a swash plate obliquely fastened to the rotary shaft to rotate together therewith, a piston accommodated in a bore of the casing and coupled to the swash plate to reciprocate within the bore by the rotation of the swash plate, and an inclination adjustment mechanism adjusting an angle of inclination of the swash plate to the rotary shaft to vary a compression capacity, wherein the inclination adjustment mechanism comprises a rotor fastened to the rotary shaft to be rotated and excited together with the rotary shaft when the clutch is magnetized, wherein the rotation measurement means comprises a hall effect sensor for measuring a magnetic flux of the rotor, wherein the hall effect sensor is seated to a sensor mounting groove formed in the casing, wherein the sensor mounting groove is formed in an outer surface of the casing, is formed to communicate with an outside of the casing, and is formed to be shut off from the inside of the casing, and wherein the sensor mounting groove is formed so that a measurement portion of the hall effect sensor is located inside a region where the coil and the rotor face each other.

* * * * *